(12) United States Patent
Naka et al.

(10) Patent No.: US 7,359,631 B2
(45) Date of Patent: Apr. 15, 2008

(54) LENS DRIVING DEVICE, IMAGING DEVICE USING THE SAME, AND SMALL-SIZED ELECTRONICS DEVICE USING THE SAME

(75) Inventors: Yoji Naka, Saitama (JP); Takehiko Senba, Saitama (JP); Mitsuo Manabe, Saitama (JP)

(73) Assignees: FUJIFILM Corporation, Tokyo (JP); Fujinon Corporation, Saitama (JP)

( * ) Notice: Subject to any disclaimer, the term of this patent is extended or adjusted under 35 U.S.C. 154(b) by 393 days.

(21) Appl. No.: 11/230,562

(22) Filed: Sep. 21, 2005

(65) Prior Publication Data

US 2006/0062559 A1 Mar. 23, 2006

(30) Foreign Application Priority Data

Sep. 22, 2004 (JP) ............................ 2004-274895

(51) Int. Cl.
*G03B 17/00* (2006.01)
*G03B 13/00* (2006.01)
*G02B 7/02* (2006.01)
(52) U.S. Cl. ..................... 396/79; 348/345; 359/824
(58) Field of Classification Search ................. 396/72, 396/73, 74, 79, 83, 86; 348/345; 359/824
See application file for complete search history.

(56) References Cited

U.S. PATENT DOCUMENTS 4,596,449 A 6/1986 Iwata et al.
4,605,286 A 8/1986 Sumi
6,800,970 B2 10/2004 Aoshima
7,206,145 B2 * 4/2007 Otaka et al. ................ 359/824
7,221,526 B2 * 5/2007 Manabe ...................... 359/824

FOREIGN PATENT DOCUMENTS

JP 56-147132 A 11/1981
JP 62-195615 A 8/1987

* cited by examiner

*Primary Examiner*—Rodney Fuller
(74) *Attorney, Agent, or Firm*—Sughrue Mion, PLLC

(57) ABSTRACT

An imaging device moves a taking lens in an optical-axis direction by a hollow stepping motor of a claw-pole type comprising a disk-shaped hollow magnet and stators. The magnet is disposed in a direction perpendicular to the optical axis. The stators are respectively adjacent to both surfaces of the magnet in the optical-axis direction. When the magnet is rotated, attractive force caused by the respective stators is applied in the optical axis direction. It is prevented that the magnet and a rotary barrel are attracted in the direction perpendicular to the optical axis. Thus, electric power consumption is prevented from increasing due to friction with upper and lower covers, and abnormal noise is prevented from occurring due to the friction.

16 Claims, 9 Drawing Sheets

PULSE CURRENT IN FORWARD DIRECTION →

PULSE CURRENT IN BACKWARD DIRECTION →

PULSE CURRENT IN BACKWARD DIRECTION →

PULSE CURRENT IN FORWARD DIRECTION →

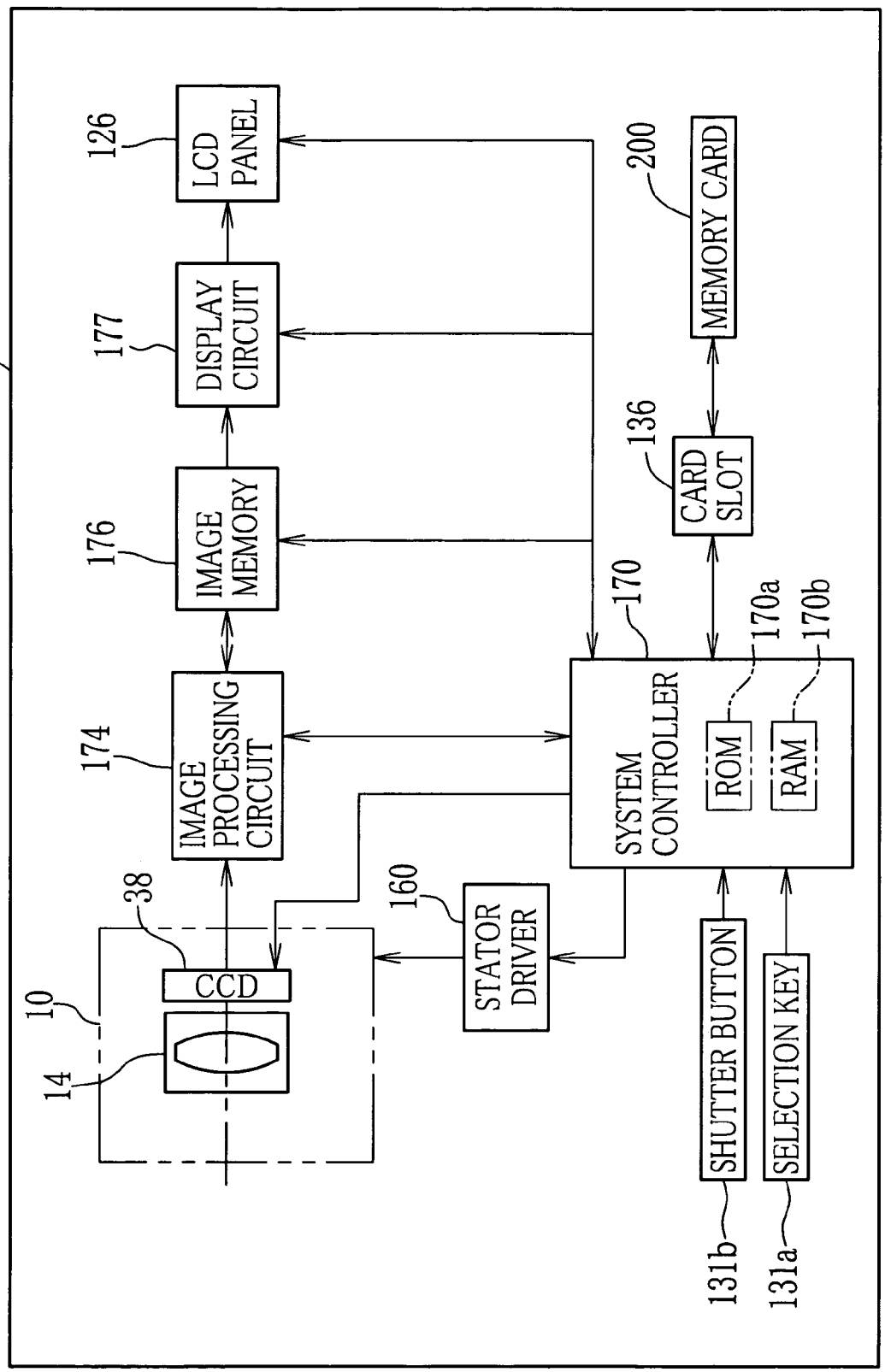

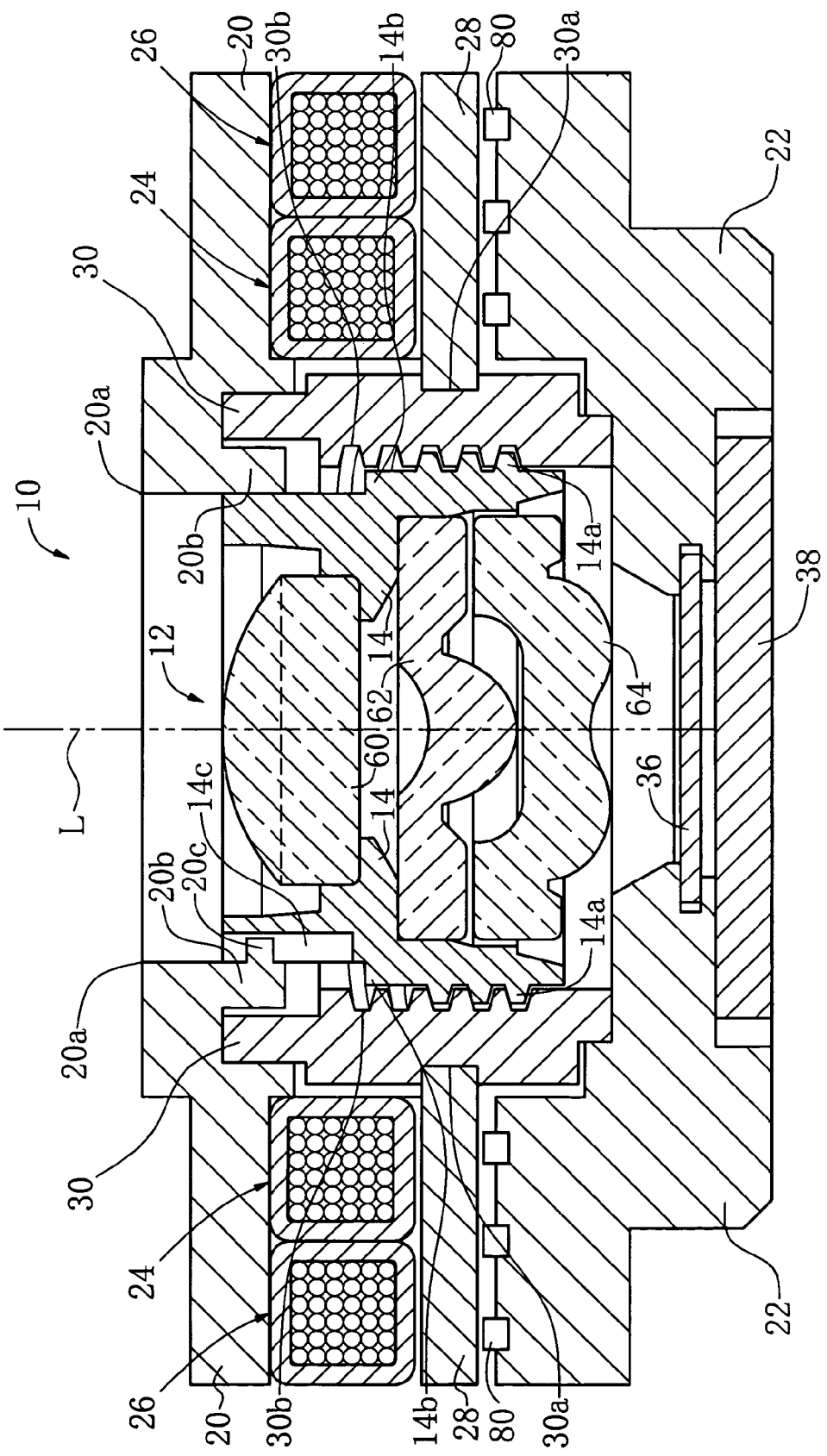

LENS DRIVING DEVICE, IMAGING DEVICE USING THE SAME, AND SMALL-SIZED ELECTRONICS DEVICE USING THE SAME

BACKGROUND OF THE INVENTION

1. Field of the Invention

The present invention relates to a lens driving device for moving a lens in an optical-axis direction, and further relates to an imaging device and a small-sized electronics device using this lens driving device.

2. Description of the Related Art

Small-sized electronics devices are widely used. As to this kind of the electronics devices, there are a cell-phone, a PDA (Personal Digital Assistant) and so forth having a built-in imaging device for taking a subject image and obtaining digital image data. Since the small-sized electronics device carried around comprises the imaging device, shooting is easily performed at any time without carrying a digital still camera, a digital video camera or the like. Moreover, it is general that this kind of the small-sized electronics device preliminarily has a data communication function utilizing infrared rays and so forth. Thus, there is an advantage that it is possible to immediately transfer the taken image data to another cell-phone, a personal computer, etc.

In the meantime, the imaging device built in the small-sized electronics device has a much smaller size in comparison with a normal digital still camera. Therefore, components of a lens, a CCD sensor and so forth are greatly restricted in size. Due to this, an image function and quality of the obtained image data are insufficient. At present, the imaging device built in the small-sized electronics device is not used as an alternative device of the digital still camera.

In order to break this circumstance, in recent years, a high-pixel small CCD sensor and a high-contrast small lens are developed so that the quality of the image is rapidly improved. Moreover, for the purpose of enriching the image function, some of the published small-sized electronics devices comprise an automatic focus function and a zoom function, which are normally incorporated in the digital still camera.

The automatic focus function and the zoom function are carried out by moving a lens inside the imaging device in an optical-axis direction. The imaging device built in the small-sized electronics device preferably employs a hollow stepping motor for driving the lens. In the stepping motor, a cylindrical hollow rotor is rotated by supplying a pulse current to a stator surrounding the periphery of the hollow rotor. This hollow rotor surrounds a lens barrel holding the lens.

The respective components of the above imaging device are secured by an upper cover and a lower cover. Between inner surfaces of the respective covers and an outer surface of the hollow rotor, gaps are formed so that the hollow rotor smoothly rotates.

However, due to the gap, the hollow rotor jounces in a direction perpendicular to the optical axis. Thus, there arises a problem in that the stator and the hollow rotor coaxially disposed are decentered. If the hollow rotor is rotated in the decentered state, unbalance is caused regarding attractive force and repulsive force, and the hollow rotor is attracted to a side nearing the stator.

Thereupon, the hollow rotor comes into contact with the inner surfaces of the respective covers while rotating. Consequently, electric power consumption increases and abnormal noise is caused.

SUMMARY OF THE INVENTION

In view of the foregoing, it is a primary object of the present invention to provide a lens driving device for moving a taking lens in an optical-axis direction, in which electric power consumption is reduced.

It is a second object of the present invention to provide an imaging device using the above-mentioned lens driving device, in which electric power consumption is reduced.

In order to achieve the above and other objects, the lens driving device according to the present invention comprises a first stator, a second stator, a disk-shaped hollow rotor, a rotary barrel, a lens holder and a moving mechanism. The first and second stators have a cylindrical shape and generate magnetic fields based on flowing electric current. The rotor is coaxially positioned with the respective stators so as to be adjacent thereto in an axial direction. The rotor is rotated in accordance with the magnetic fields generated by the respective stators. The rotary barrel is disposed at the inside of the respective stators and the rotor so as to be coaxially positioned therewith. The rotary barrel is rotated in association with the rotation of the rotor. The lens holder is disposed at the inside of the rotary barrel so as to be coaxially positioned therewith. The lens holder has a cylindrical shape and holds a lens in a state that the axial direction coincides with an optical axis of the lens. The moving mechanism converts rotational movement of the rotary barrel into linear motion in the axial direction. The converted linear motion is transmitted to the lens holder to move this lens holder in the axial direction in accordance with the rotation of the rotary barrel. The imaging device according to the present invention employs the above-mentioned lens driving device In a preferred embodiment, the first stator is adjacent to one surface of the rotor, and the second stator is adjacent to the other surface of the rotor.

In another embodiment, the second stator is disposed at the outside of the first stator so as to be coaxially positioned therewith, and these stators are adjacent to one surface of the rotor.

According to the present invention, the rotor is attracted in the axial direction when the respective stators are activated to rotate the rotor. Thus, the rotor and the rotary barrel are prevented from being attracted in a direction perpendicular to the optical axis, even if the rotor and the stators are rotated in an eccentric state. It is prevented that electric power consumption increases due to friction with a cover holding the rotary barrel. Further, it is prevented that abnormal noise occurs due to the friction with the cover.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 9 is a block diagram schematically showing an internal structure of the camera-equipped cell-phone; and FIG. 10 is a sectional view schematically explaining another embodiment of the imaging device.

DETAILED DESCRIPTION OF THE PREFERRED EMBODIMENT(S)

Figure 1:
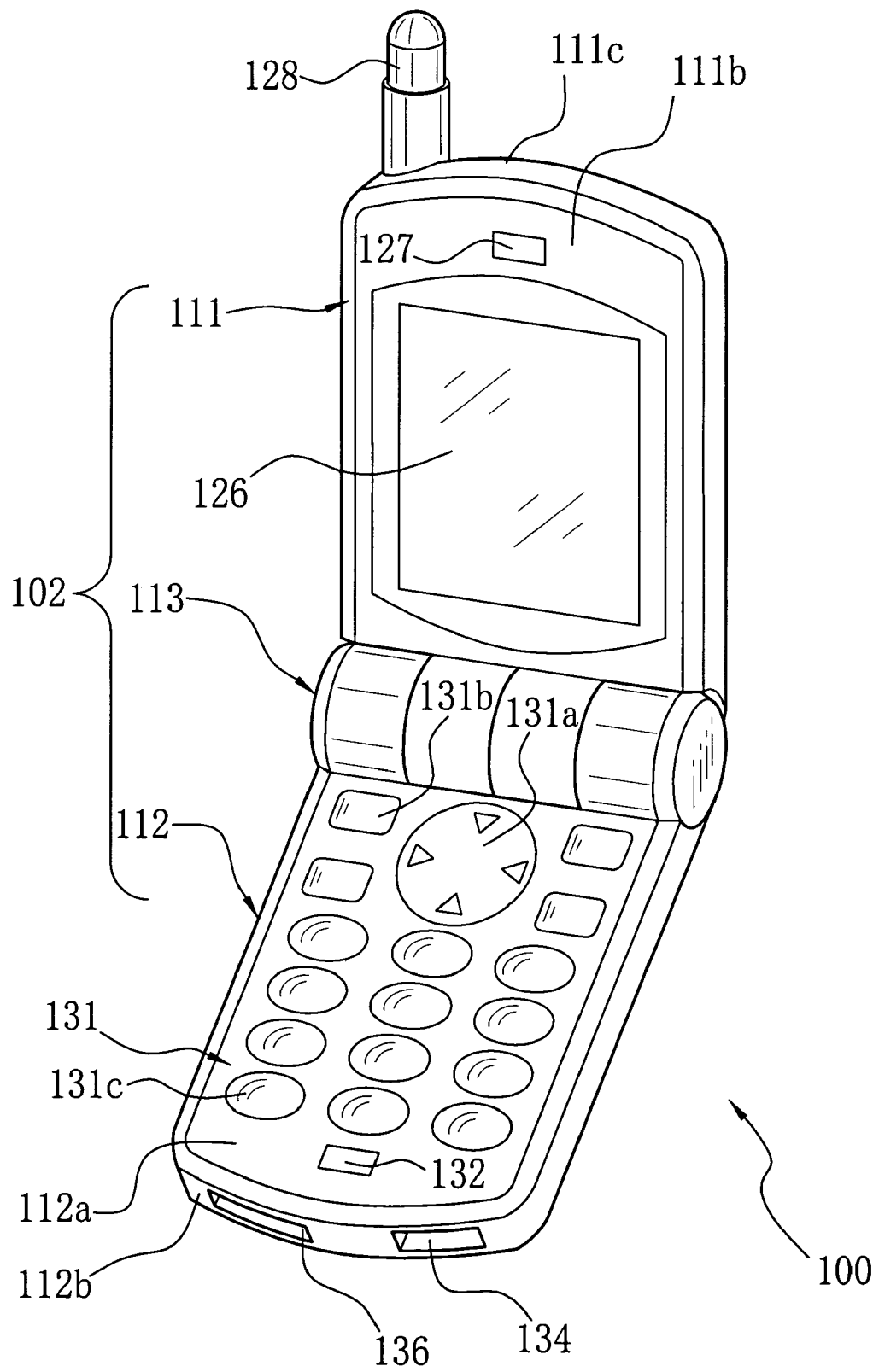
FIG. 1 is a perspective view showing a front appearance of a camera-equipped cell-phone.
Figure 2:
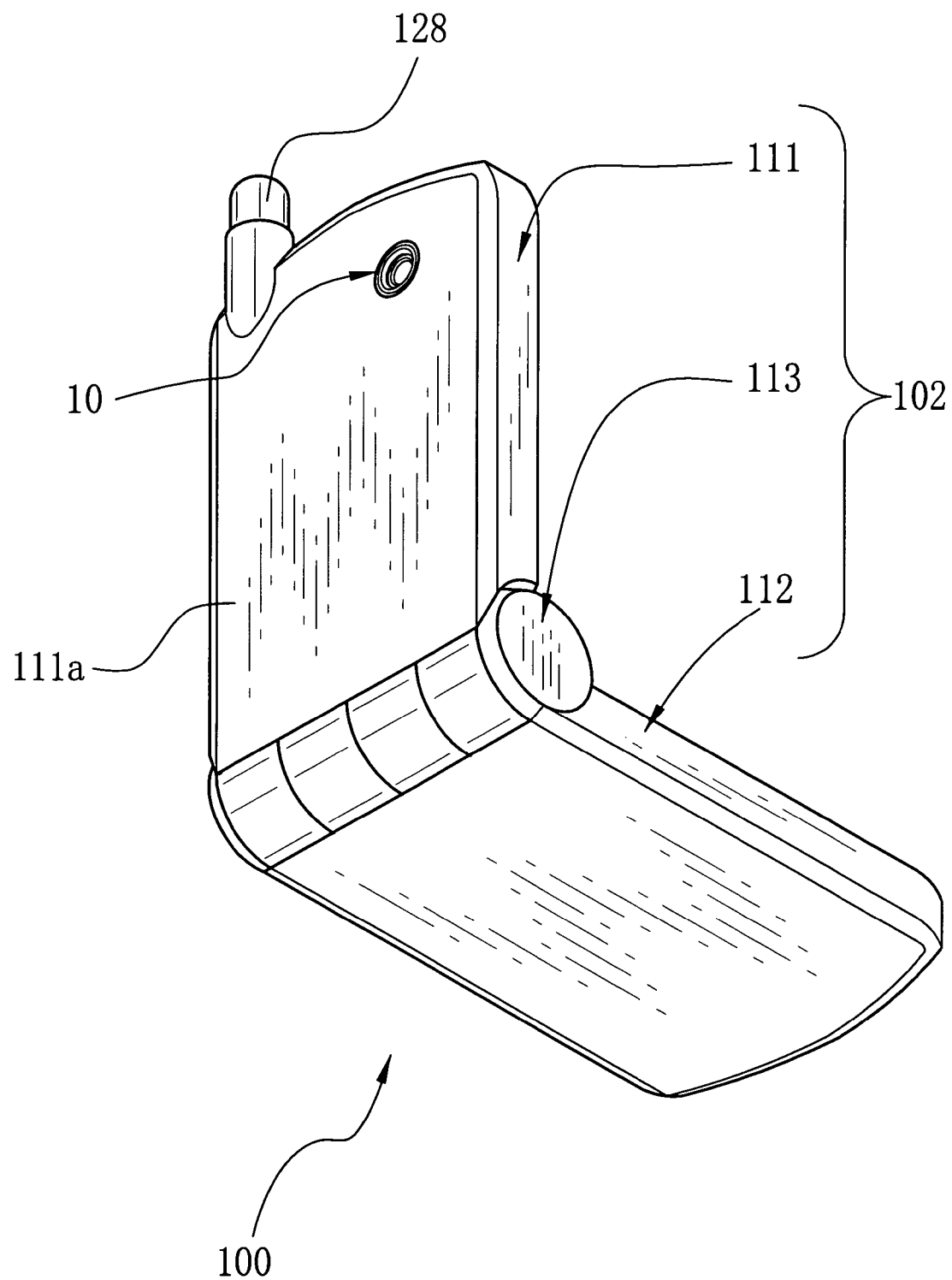
FIG. 2 is a perspective view showing a rear appearance of the camera-equipped cell-phone.

FIGS. 1 and 2 are external perspective views respectively showing a front side and a rear side of a camera-equipped cell-phone comprising an imaging device according to the present invention. A main body 102 of the camera-equipped cell-phone 100 includes an upper body 111, a lower body 112 and a hinge 113 rotatably connecting the respective bodies 111 and 112.

As shown in FIG. 2, the upper body 111 is provided with the imaging device 10 according to the present invention. The camera-equipped cell-phone 100 obtains image data from the imaging device 10. The hinge 113 is provided with a clicking mechanism (not shown) for retaining the upper and lower bodies 111 and 112 at a predetermined angle during a usage time of the camera-equipped cell-phone 100. It is possible to open and fold the upper and lower bodies 111 and 112 by rotating the main body 102 around the hinge 113. When the camera-equipped cell-phone 100 is not used, the upper and lower bodies 111 and 112 are folded so as to be parallel with each other.

The respective bodies 111 and 112 are formed in a rectangular thin shape. The imaging device 10 is exposed at the rear 111a of the upper body 111. An LCD panel 126 and a speaker 127 are disposed at the front 111b of the upper body 111. An antenna 128 is disposed at the top 111c of the upper body 111. Moreover, an operating portion 131 and a microphone 132 are disposed at the front 112a of the lower body 112. Further, a socket 134 and a card slot 136 are formed at the bottom 112b of the lower body 112. The socket 134 is connected to an external equipment of a personal computer and so forth with a cable. The card slot 136 is loaded with a memory card.

The antenna 128 receives radio signals from the other cell-phone and an Internet server at a time to call and to utilize an e-mail service, an Internet-connection service and so forth. In addition, the antenna 128 sends radio signals from the camera-equipped cell-phone 100 toward the outside. The speaker 127 outputs a voice of the party and a ring alert. The LCD panel 126 displays varied information concerning a menu picture, a telephone number of the party, and so forth. Further, the LCD panel 126 displays a through image obtained by the imaging device 10, an image recorded in the memory card, and so forth. The microphone 132 converts a voice of a person, who is talking, into an electrical voice signal.

The operating portion 131 includes a selection key 131a, a shutter button 131b, a dial key 131c and so forth. The selection key 131a is used for selecting and setting the varied menus. The camera-equipped cell-phone 100 is capable of shooting a subject by selecting an image mode from among the various modes. Selecting the mode is performed with the selection key 131a, which is also used for a subject-imaging operation of the imaging device 10. The shutter button 131b is used for a release operation when an image is taken by the imaging device 10. The dial key 131c is handled for inputting a telephone number, a text of an e-mail and so forth.

Figure 3:
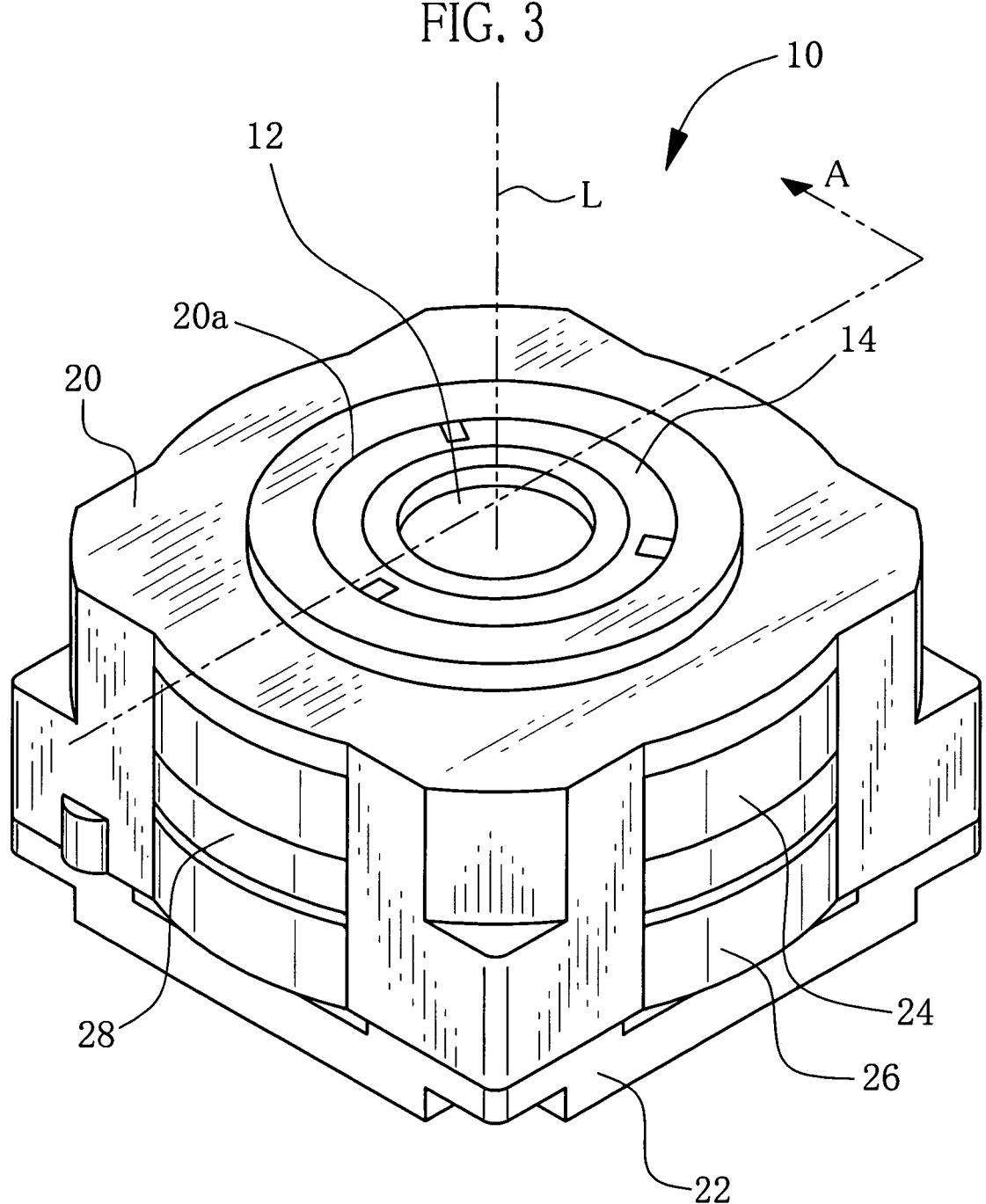
FIG. 3 is an external perspective view schematically explaining a structure of an imaging device.

FIG. 3 is an external perspective view schematically showing a structure of the imaging device 10 according to the present invention. The imaging device 10 comprises a taking lens 12 for forming an image of subject light, a lens holder 14 for holding the taking lens 12, cylindrical first and second stators 24 and 26 for moving the lens holder 14 in an optical-axis direction, and upper and lower covers 20 and 22 for securing theses components. Between the first and second stators 24 and 26, interspace is formed. In this interspace, a hollow disk-shaped magnet (rotor) 28 is disposed so as to be perpendicular to an optical axis L.

Figure 4:
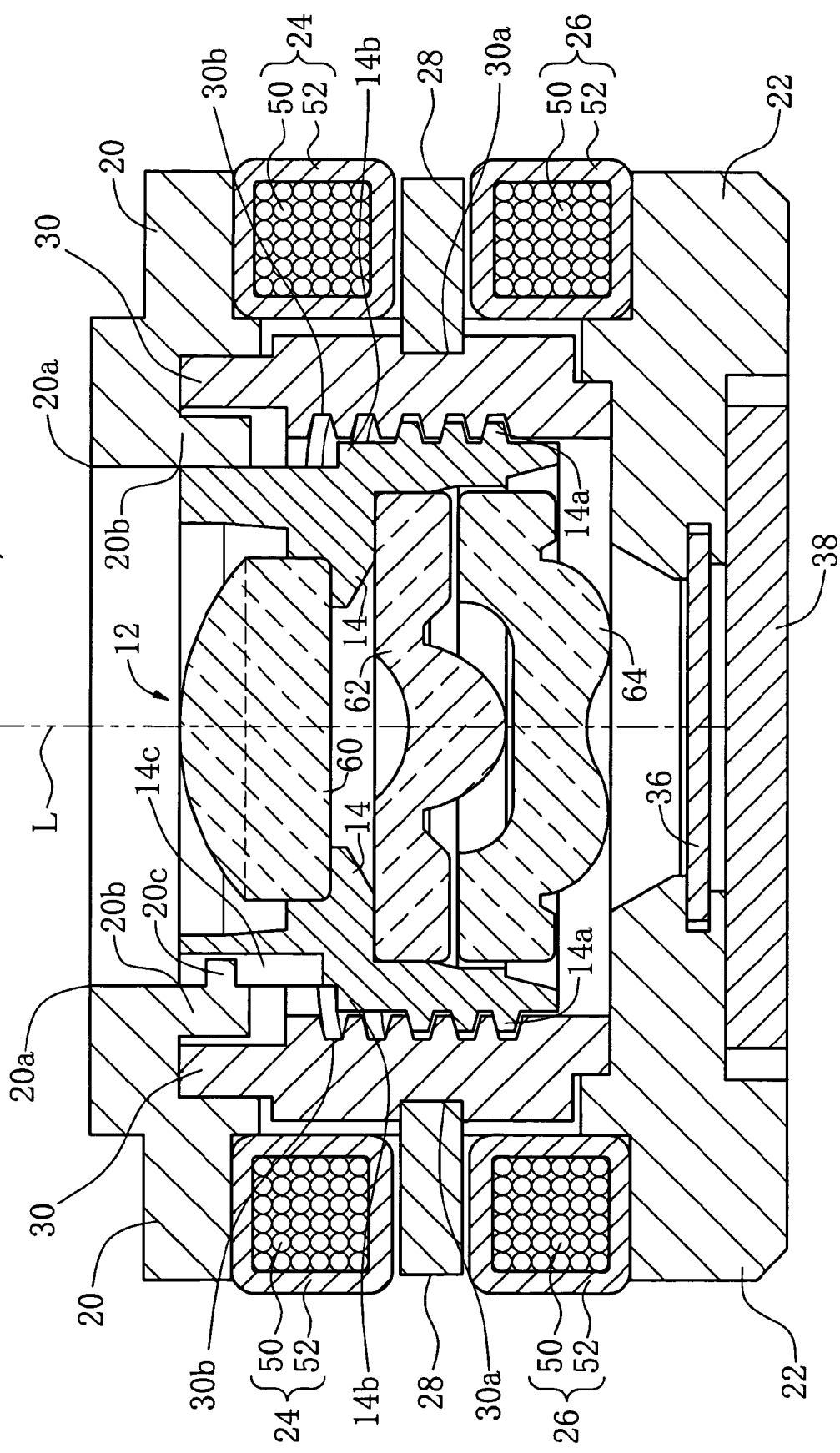
FIG. 4 is a sectional view schematically explaining the structure of the imaging device.

FIG. 4 is a sectional view, which schematically explains a structure of the imaging device 10 and is viewed in a direction shown by an arrow A (see FIG. 3). The inside of the stators 24 and 26 is provided with a rotary barrel 30, the lens holder 14 and the taking lens 12, which are disposed in this order from inner surfaces of the stators 24 and 26. The lens holder 14 and the rotary barrel 30 are formed in a cylindrical shape and are coaxially disposed with the respective stators 24 and 26. A concave 30a is formed at a central portion of an outer surface of the rotary barrel 30. By fitting the magnet 28 into the concave 30a, the magnet 28 and the rotary barrel 30 are unitized.

A low-pass filter 36 and a CCD sensor (solid-state image sensor) 38, which are held by the lower cover 22, are disposed under the taking lens 12. Incidentally, the above components except for the low-pass filter 36 and the CCD sensor 38 constitute a lens driving device according to the present invention.

The taking lens 12 is constituted by three lenses of a first lens 60, a second lens 62 and a third lens 64, which are disposed in this order from the upper cover 20. The subject light focused by the first, second and third lenses 60, 62 and 64 is received by the CCD sensor 38 through the low-pass filter 36.

The low-pass filter 36 eliminates fine spatial-frequency component included in the subject light. In virtue of the low-pass filter 36, it is possible to reduce troubles of pseudo color, moire and so forth.

The CCD sensor 38 photoelectrically converts the subject light, which has passed through the low-pass filter 36, to produce image data in accordance with the subject light.

The respective stators 24, 26 and the magnet 28 constitute a hollow stepping motor of a claw-pole type. Upon supplying a pulse current to the respective stators 24 and 26, the magnet 28 is rotated by a rotational angle corresponding to a pulse number of the pulse current.

The respective stators 24 and 26 are disposed at both sides of the magnet 28 so as to be adjacent thereto in the optical-axis direction. The respective stators 24 and 26 are constituted with a coil 50 formed by winding a conductive wire in a cylindrical shape, and a cylindrical yoke 52 for surrounding the coil 50. The yoke 52 is made of a magnetic material of iron and so forth, and is magnetized by lines of magnetic force generated by the contained coil 50.

Figure 5:
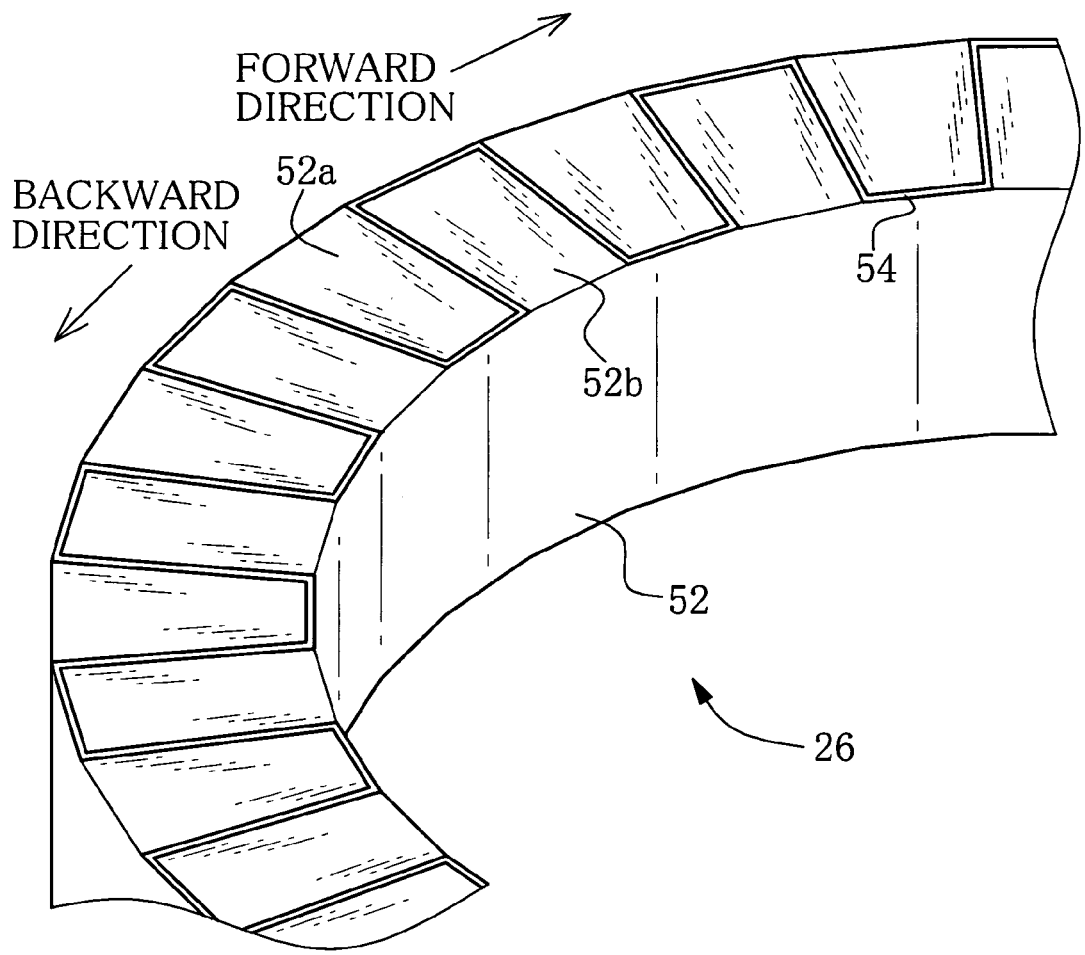
FIG. 5 is a partial perspective view schematically explaining a structure of a coil portion.

FIG. 5 is a perspective view showing an exterior of the second stator 26. At an upper surface of the yoke 52 of the second stator 26, namely at a surface adjacent to the magnet 28, a gap 54 of a rectangular-wave shape is formed so as to run between the inner side and the outer side. The gap 54 divides the upper surface of the yoke 52 of the second stator 26 into teeth 52a and 52b. The tooth 52a becomes narrower from the outer side toward the inner side. The tooth 52b becomes wider from the inner side toward the outer side.

The first stator 24 has an identical structure with the second stator 26 turned upside down, and is provided with the gaps 54 and the teeth 52a and 52b formed at a lower surface being adjacent to the magnet 28.

The pulse current alternately flows in the coils 50 of the first and second stators 24 and 26. When the pulse current flows, concentric lines of magnetic force are generated at the coil 50 around the current (so-called right-handed screw rule). The generated line of the magnetic force passes through the inside of the yoke 52 made of the magnetic material, and then is temporarily discharged into the air when having reached the tooth 52a or 52b. The discharged line of the magnetic force passes through the gap 54 and enters the inside of the yoke 52 again. In this way, one of the teeth 52a and 52b, which are formed so as to mesh with each other, discharges the line of the magnetic force, and the discharged line of the magnetic force enters the other of the teeth 52a and 52b. The tooth from which the line of the magnetic force is discharged becomes a north pole. The tooth into which the line of the magnetic force enters becomes a south pole. Magnetic fields of the north pole and the south pole are alternately generated at the upper surface or the lower surface of the yoke 52.

Figure 6:
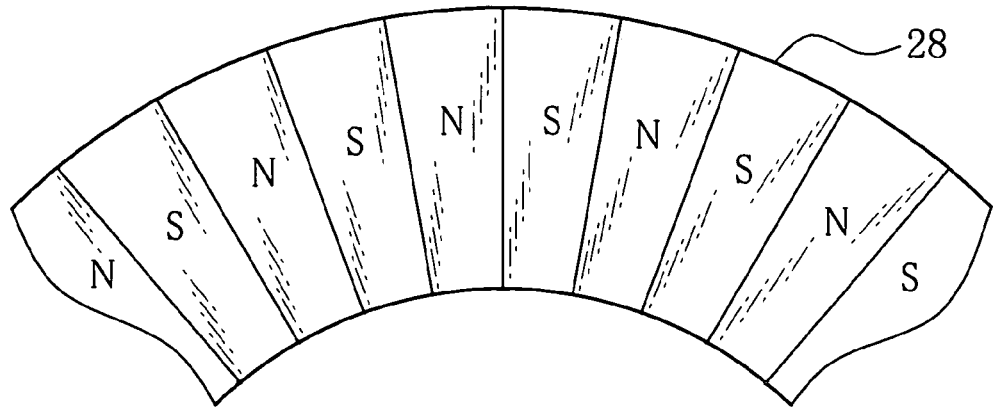
FIG. 6 is a partial plan view schematically explaining a structure of a magnet.

The magnet 28 is a permanent magnet, which is magnetically polarized so as to alternately arrange the north pole and the south pole at regular intervals, such as shown in FIG. 6. The magnet 28 is rotated by repulsive force and attractive force caused between the magnet 28 and the magnetic fields generated by the respective stators 24 and 26.

Moreover, the magnet 28 is magnetically polarized so as to have forty-eight poles. Meanwhile, the teeth 52a and 52b of the stators 24 and 26 are respectively formed by twenty-four, namely are formed by forty-eight in total. In this regard, positions of the teeth 52a and 52b of the first stator 24 are shifted relative to positions of the teeth 52a and 52b of the second stator 26 by a half of the tooth (see FIGS. 7 and 8). Incidentally, the magnetic-pole number of the magnet 28 and the numbers of the teeth 52a and 52b are not limited to the above-noted numbers.

FIGS. 7A to 7D are explanatory illustrations showing a procedure performed at a time when the magnet 28 is rotated in a forward direction. With respect to the rotational direction of the magnet 28 and the direction of the pulse current flowing in the respective stators 24 and 26, a clockwise direction is defined as the forward direction and a counter-clockwise direction is defined as a backward direction (see FIG. 5).

Figure 7A:
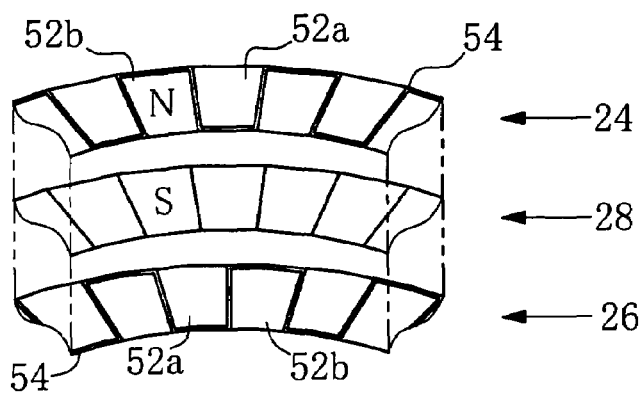
FIGS. 7A to 7D are explanatory illustrations showing a procedure performed at a time when the magnet is rotated in a forward direction.

For rotating the magnet 28 in the forward direction, it is performed first to let the pulse current flow in the first stator 24 in the forward direction, such as shown in FIG. 7A. The first stator 24, in which the pulse current flows in the forward direction, magnetically polarizes the tooth 52a in the south pole and magnetically polarizes the tooth 52b in the north pole to respectively attract the counterpart of the magnetic poles of the magnet 28.

Figure 7B:
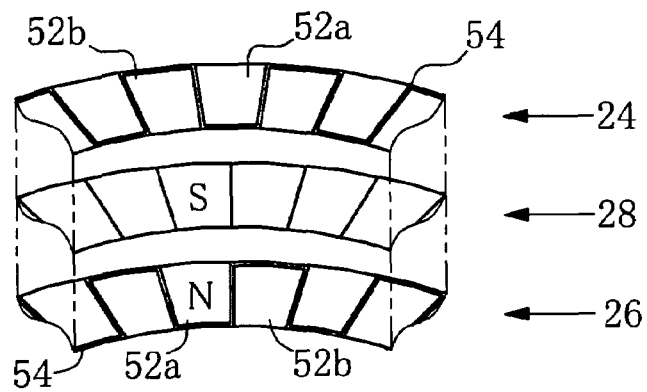
Figure 7C:
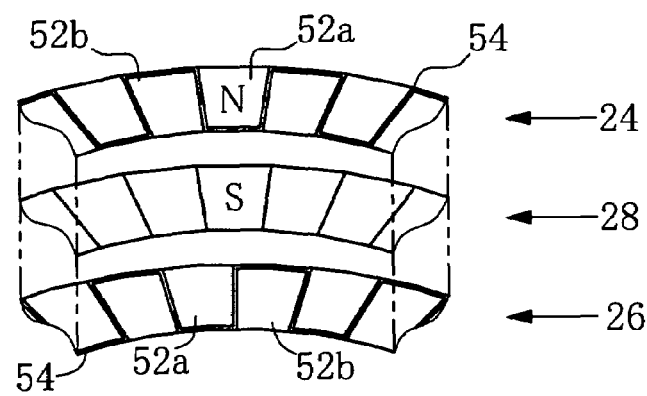
Figure 7D:
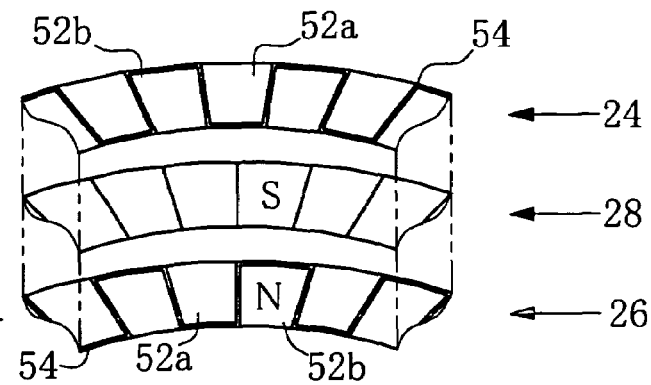
Figure 8A:
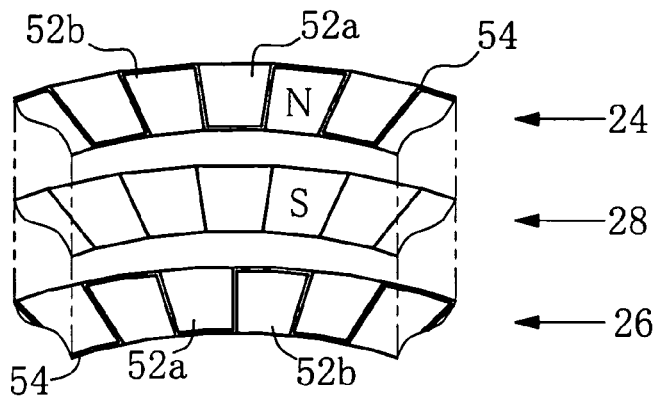
FIGS. 8A to 8D are explanatory illustrations showing a procedure performed at a time when the magnet is rotated in a backward direction.
Figure 8B:
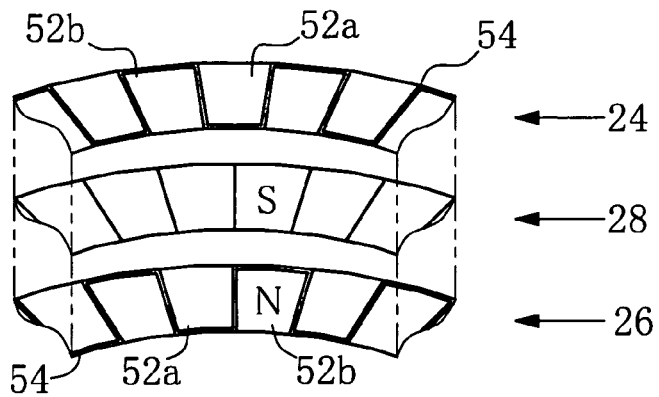
Figure 8C:
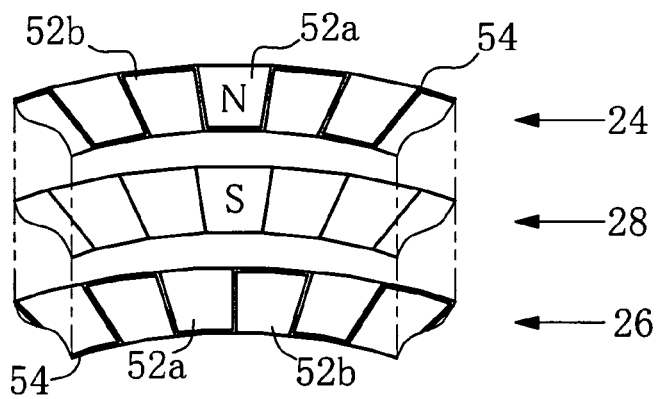
Figure 8D:
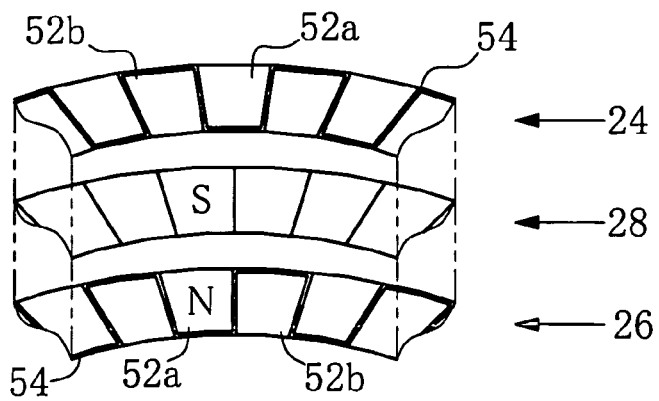

Successively, it is performed to let the pulse current flow in the second stator 26 in the forward direction, such as shown in FIG. 7B. Since the positions of the teeth 52a and 52b of the first stator 24 are shifted relative to the positions of the teeth 52a and 52b of the second stator 26 by the half of the tooth, the magnet 28 is attracted by the respective teeth 52a and 52b of the magnetically-polarized second stator 26 so as to rotate in the forward direction by the half of the tooth. Continuously, the stator 24 is electrified by the pulse current flowing in the backward direction, and then, the second stator 26 is electrified by the pulse current flowing in the backward direction. After that, the procedure shown in FIG. 7A is performed again. By repeating this procedure, the magnet 28 is rotated in the forward direction.

In the meantime, when the magnet 28 is rotated in the backward direction, a procedure shown in FIGS. 8A to 8D is performed. Concretely, the first stator 24 is electrified by the forward-direction pulse current, and then, the second stator 26 is electrified by the backward-direction pulse current. Successively, the first stator 24 is electrified by the backward-direction pulse current, and then, the second stator 26 is electrified by the forward-direction pulse current. By electrifying the stators 24 and 26 repeatedly in this order, the magnet 28 is rotated in the backward direction.

As described above, by alternately electrifying the first and second stators 24 and 26, the magnet 28 is rotated. Upon one pulse, the magnet 28 is rotated by the half of the tooth. The magnet 28 makes one rotation when the first and second stators 24 and 26 are respectively electrified by forty-eight pulses, namely are electrified by ninety-six pulses in total.

As shown in FIG. 4, the rotary barrel 30 is unitized with the magnet 28, and is rotated in association therewith. In order to smoothly rotate the rotary barrel 30, a small gap is formed between the inner surfaces of the covers 20, 22 and the outer surface of the rotary barrel 30. Moreover, a helical groove 30b is formed on the inner surface of the rotary barrel 30. The helical groove 30b meshes with a helical thread 14a formed on the outer surface of the lens holder 14.

Torque of the rotary barrel 30 is converted into a force, which is applied in the optical-axis direction, by the helical groove 30b and the helical thread 14a. The helical groove 30b of the rotary barrel 30 is formed so as to be longer than the helical thread 14a of the lens holder 14 by two rounds thereof. The converted force in the optical-axis direction is transmitted to the lens holder 14 to move this lens holder 14 in the optical-axis direction. In other words, the helical groove 30b and the helical thread 14a are the so-called helicoid and are regarded as a moving mechanism of the present invention.

Meanwhile, a movement distance of the lens holder 14 depends on a pitch of the helical groove 30b and the helical thread 14a. When the rotary barrel 30 makes two rotations, the lens holder 14 moves for a full stroke. Since the rotary barrel 30 makes one rotation by electrifying the respective stators 24 and 26 with 96 pulses, the rotary barrel is adapted to have a resolution corresponding to 192 pulses. It is possible to control the movement distance of the lens holder 14 in accordance with the pulse number of the pulse current to be supplied.

As shown in FIG. 3, an opening 20a for exposing the taking lens 12 is formed in the top surface of the upper cover 20. The inside of the opening 20a is provided with a cylindrical portion 20b extending inwardly (see FIG. 4).

A step 14b having a different diameter is formed on the outer surface of the lens holder 14. As the lens holder 14 moves in a direction separating from the CCD sensor 38 (hereinafter, this direction is defined as the fore direction), the cylindrical portion 20b comes into contact with the step 14b to prevent the lens holder 14 from further moving in the fore direction.

If the taking lens 12 moves in the optical-axis direction with rotation, an image is likely to be shifted due to eccentricity of the taking lens 12. In view of this, the outer surface of the lens holder 14 is provided with a straight key groove 14c formed in the optical-axis direction. Further, the cylindrical portion 20b of the upper cover 20 is provided with a key member 20c engaging with the straight key groove 14c. In virtue of this, when the lens holder 14 moves in the optical-axis direction, the lens holder 14 is guided by the straight key groove 14c and the key member 20c so as to move in the optical-axis direction without rotation.

FIG. 9 is a block diagram showing a structure of the camera-equipped call-phone 100, which is necessary for explaining the present invention.

Image data outputted from the CCD sensor 38 is inputted into an image processing circuit 174 being as a so-called analog-front-end circuit. The image processing circuit 174 converts the analog image data into the digital image data. In addition, the image processing circuit 174 performs, for the image data, image-quality adjustment concerning brightness-level correction, white-balance correction and so forth. Furthermore, the image processing circuit 174 performs YC processing, fixed-length processing and compression processing for the image data.

In a case that the through image is displayed on the LCD panel 126 during shooting, simple YC processing is performed for the image data, of which image quality has been adjusted, to convert the image data into simple YC image data including brightness data and color-difference data. The simple YC image data is read out to a display circuit 177 via an image memory 176, and then, is converted into a composite signal of NTSC and so force. The composite signal is inputted into the LCD panel 126.

When shooting has been conducted, the image processing circuit 174 performs regular YC processing for the image data, of which image quality has been adjusted, to produce YC image data. After that, the fixed-length processing and the compression processing are performed for the YC image data to convert this YC image data into compressed image data of JPEG format and so forth. The compressed image data is stored in a RAM 170b, which is described later, and is written in a memory card 200 via the card slot 136.

A system controller 170 for controlling the whole of the camera-equipped cell-phone 100 is a microcomputer, for instance, and comprises a ROM 170a and the RAM 170b besides a CPU. The ROM 170a stores control programs, varied setting data and so forth. The RAM 170b stores varied data produced at the controlling time. The system controller 170 is connected to a stator driver 160 via which the pulse current is supplied to the respective stators 24 and 26 to control the movement of the lens holder 14.

Next, operation of the camera-equipped cell-phone 100 and the imaging device 10 having the above structure is described below. Upon instructions of focusing and zooming, which are performed for the camera-equipped cell-phone 100 by handling the selection key 131a, the system controller 170 supplies the pulse current to the respective stators 24 and 26 via the stator driver 160 to move the lens holder 14.

At this time, since the respective stators 24 and 26 are adjacent to the magnet 28 in the optical-axis direction, the attractive force is applied to the magnet 28 in the optical-axis direction (see FIGS. 7 and 8). By virtue of this, the magnet 28 and the rotary barrel 30 are prevented from being attracted in a perpendicular direction even if the magnet 28 is rotated in an eccentric state relative to the respective stators 24 and 26. Thus, electric power consumption is prevented from increasing due to friction, and abnormal noise is also prevented from occurring due to friction.

In the above embodiment, the helicoid comprising the helical groove 30b and the helical thread 14a constitutes the moving mechanism. However, this is not exclusive. For example, a cam groove may be formed on the inner surface of the rotary barrel 30, and a cam pin for engaging with this cam groove may be formed on the outer surface of the lens holder 14. In this case, the moving mechanism is constituted by a cam mechanism comprising the cam groove and the cam pin.

In the above embodiment, the CCD sensor 38 is used as the solid-state image sensor. However, this is not exclusive. It is possible to use the other-type solid-state image sensor of a CMOS image sensor and so force.

In the above embodiment, the respective stators 24 and 26 are adjacent to both faces of the magnet 28. However, such as shown in FIG. 10, the second stator 26 may be disposed at the outside of the first stator 24, and the respective stators 24 and 26 may be adjacent to one of the faces of the magnet 28. In this case, the gap 54 and the teeth 52a and 52b are formed at the surfaces of the respective stators 24 and 26, which are adjacent to the magnet 28. The teeth 52a and 52b of the first stator 24 are shifted relative to the teeth 52a and 52b of the second stator 26 by the half of the tooth. Meanwhile, the lower cover 22 has a face confronting the magnet 28 and this face is provided with rollers arranged in a radial manner for the purpose of smoothly rotating the magnet 28 and the rotary barrel 30.

In the above, the present invention is applied to the electronic camera built in the camera-equipped cell-phone. The present invention, however, is not exclusive to this and may be applicable to a so-called silver salt camera in which the photographic film is exposed to record a subject image. Further, the present invention is widely applied to the other optical devices besides the camera, for example, projecting devices of a projector etc. and pick-up lens devices used for reading data recorded in a CD-ROM, a DVD and so forth.

In the above embodiments, as an example of the hollow motor, is described the so-called PM-type stepping motor of the claw-pole type in which the permanent magnet is used. The present invention, however, is not exclusive to this. For instance, the stepping motors of a VR-type and a HB-type may be employed. Further, the other motors of a servomotor and so forth may be employed.

In the above embodiments, the stator is the coil and the rotor is the magnet. However, in a case of the other motor, the stator may be the magnet and the rotor may be the coil.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens driving device for moving a lens, comprising:
    cylindrical first and second stators for generating magnetic fields in accordance with electric current flowing therein;
    a hollow disk-shaped rotor disposed coaxially with said first and second stators, said rotor being adjacent to said first and second stators in an axial direction thereof, and said rotor being rotated in accordance with the magnetic fields generated by said first and second stators;
    a rotary barrel disposed inside said first and second stators and said rotor so as to be coaxial therewith, said rotary barrel rotating in association with rotation of said rotor;
    a cylindrical lens holder disposed inside said rotary barrel so as to be coaxial therewith, said lens holder holding said lens such that said axial direction coincides with an optical axis of said lens; and
    a moving mechanism for converting rotational movement of said rotary barrel into linear movement in said axial direction to transmit the rotational movement to said lens holder, said moving mechanism moving said lens holder in said axial direction upon rotation of said rotary barrel.

2. A lens driving device according to claim 1, wherein said first stator is adjacent to one surface of said rotor and said second stator is adjacent to the other surface of said rotor.

3. A lens driving device according to claim 1, wherein said second stator is disposed outside said first stator so as to be coaxial therewith, and the respective stators are adjacent to one surface of said rotor.

4. A lens driving device according to claim 1, wherein said first and second stators include coils in which said current flows, and said rotor is a magnet.

5. A lens driving device according to claim 4, wherein said magnet is fitted to a concave portion, which is formed at an outer surface of said rotary barrel, to integrally rotate with said rotary barrel.

6. A lens driving device according to claim 5, wherein said moving mechanism comprises:
   a helical groove formed at an inner surface of said rotary barrel; and
   a helical thread formed at an outer surface of said lens holder to mesh with said helical groove.

7. An imaging device in which a subject light focused by a lens is photoelectrically converted, said imaging device comprising:
   cylindrical first and second stators for generating magnetic fields in accordance with electric current flowing therein;
   a hollow disk-shaped rotor disposed coaxially with said first and second stators, said rotor being adjacent to said first and second stators in an axial direction thereof, and said rotor being rotated in accordance with the magnetic fields generated by said first and second stators;
   a rotary barrel disposed inside said first and second stators and said rotor so as to be coaxial therewith, said rotary barrel rotating in association with rotation of said rotor;
   a cylindrical lens holder disposed inside said rotary barrel so as to be coaxial therewith, said lens holder holding said lens such that said axial direction coincides with an optical axis of said lens;
   a moving mechanism for converting rotational movement of said rotary barrel into linear movement in said axial direction to transmit the rotational movement to said lens holder, said moving mechanism moving said lens holder in said axial direction upon rotation of said rotary barrel; and
   a solid-state image sensor disposed so as to confront said lens, said solid-state image sensor producing image data in accordance with said subject light.

8. An imaging device according to claim 7, wherein said first stator is adjacent to one surface of said rotor and said second stator is adjacent to the other surface of said rotor.

9. An imaging device according to claim 7, wherein said second stator is disposed outside said first stator so as to be coaxial therewith, and the respective stators are adjacent to one surface of said rotor.

10. An imaging device according to claim 7, further comprising:
    a low-pass filter disposed between said solid-state image sensor and said lens, said solid-state image sensor photoelectrically converting said subject light having passed through said low-pass filter.

11. An imaging device according to claim 7, wherein said first and second stators include coils in which said current flows, and said rotor is a magnet.

12. An imaging device according to claim 11, wherein said magnet is fitted to a concave portion, which is formed at an outer surface of said rotary barrel, to integrally rotate with said rotary barrel.

13. An imaging device according to claim 12, wherein said moving mechanism comprises:
    a helical groove formed at an inner surface of said rotary barrel; and
    a helical thread formed at an outer surface of said lens holder to mesh with said helical groove.

14. A small-sized electronics device including an imaging device for photoelectrically converting a subject light focused by a lens, said imaging device including a lens driving device for moving said lens, and said lens driving device comprising:
    cylindrical first and second stators for generating magnetic fields in accordance with electric current flowing therein;
    a hollow disk-shaped rotor disposed coaxially with said first and second stators, said rotor being adjacent to said first and second stators in an axial direction thereof, and said rotor being rotated in accordance with the magnetic fields generated by said first and second stators;
    a rotary barrel disposed inside said first and second stators and said rotor so as to be coaxial therewith, said rotary barrel rotating in association with rotation of said rotor;
    a cylindrical lens holder disposed inside said rotary barrel so as to be coaxial therewith, said lens holder holding said lens such that said axial direction coincides with an optical axis of said lens; and
    a moving mechanism for converting rotational movement of said rotary barrel into linear movement in said axial direction to transmit the rotational movement to said lens holder, said moving mechanism moving said lens holder in said axial direction upon rotation of said rotary barrel.

15. A small-sized electronics device according to claim 14, wherein said small-sized electronics device is a cell-phone.

16. A small-sized electronics device according to claim 15, wherein said imaging device is disposed at a rear side of said cell-phone.

* * * * *